Aug. 24, 1965 TAKEO MATSUZAKI ETAL 3,202,925

FILTER AMPLIFIER

Filed March 22, 1961 3 Sheets-Sheet 1

Inventor
T.Matsuzaki-H.Watanabe
By
Attorney

Inventor
T.Matsuzaki-H.Watanabe
By
Attorney

FILTER AMPLIFIER

Filed March 22, 1961 3 Sheets-Sheet 3

Inventor
T. Matsuzaki-H.
By
Attorney

United States Patent Office 3,202,925
Patented Aug. 24, 1965

3,202,925

FILTER AMPLIFIER

Takeo Matsuzaki and Hitoshi Watanabe, Tokyo, Japan, assignors to Nippon Electric Company, Limited, Tokyo, Japan, a corporation of Japan Filed Mar. 22, 1961, Ser. No. 97,484
Claims priority, application Japan, Mar. 25, 1960, 35/10,084
3 Claims. (Cl. 330—31)

This invention relates to a filter amplifier composed of a combination of a constant impedance type network and a transistor circuit.

It is known to provide four-terminal filters of the constant impedance type (in specific bands) by the interconnection of two-terminal reactive impedances. Such filters result in a certain amount of attenuation of energy because of either the resistances or those resistances intentionally added.

It is an object of this invention to provide filters with simplified structures of the above type which are substantially lossless with respect to the signal energy. This is accomplished by connecting transistors in the network so that the gain in the transistors will compensate for resistance losses.

Figure 1:
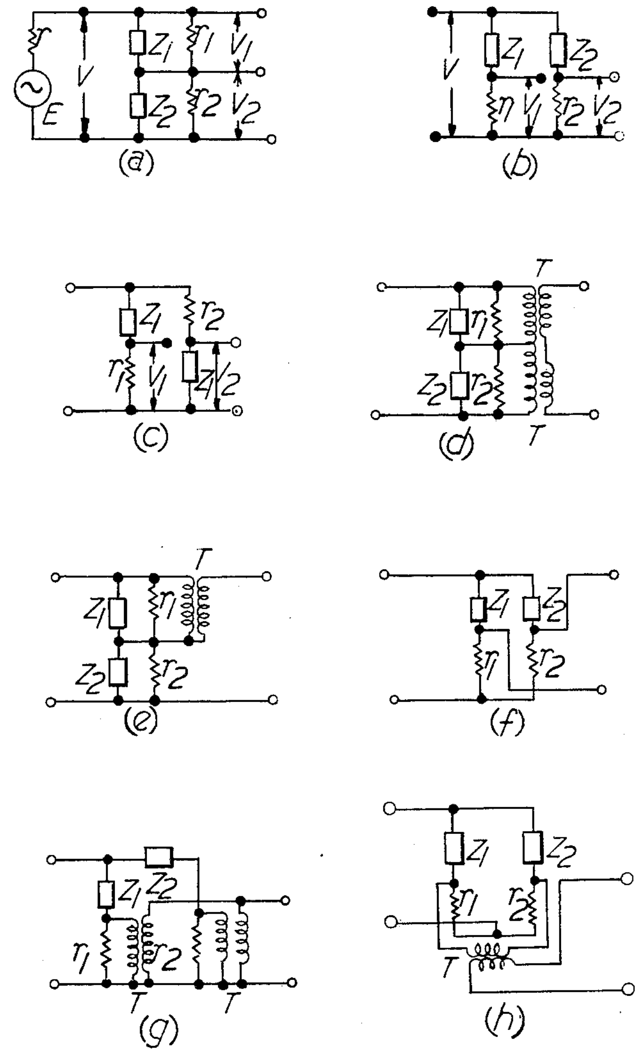
Figure 2:
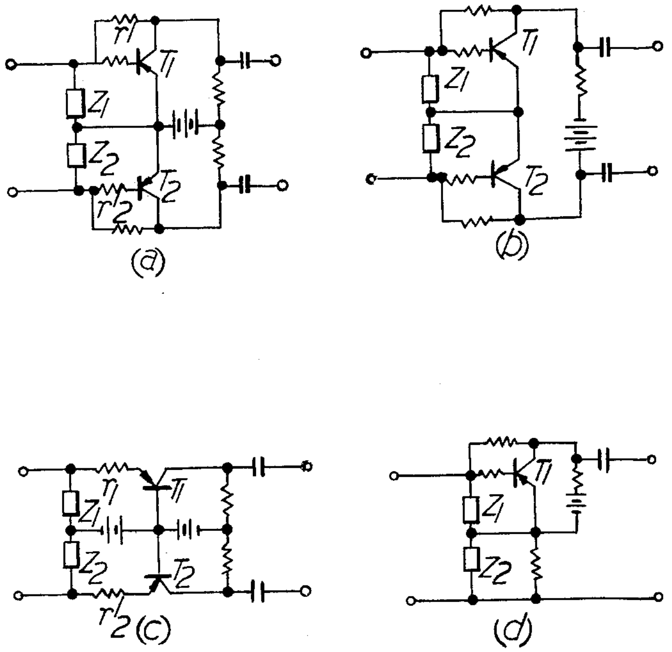
Figure 3:
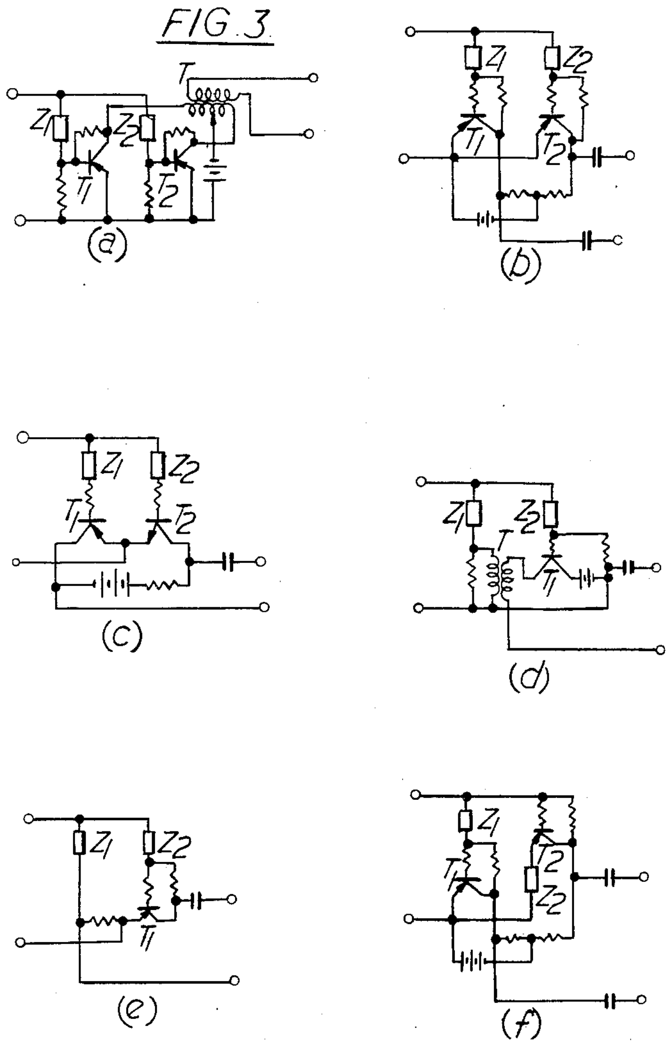

The above-mentioned and other features and objects of this invention and the manner of attaining them will become more apparent and the invention itself will be best understood by reference to the following description of an embodiment of the invention taken in conjunction with the accompanying drawings, in which:

FIGS. 1 (*a*) to (*h*) inclusive are circuit diagrams to explain the principles of this invention. FIG. 2 and FIG. 3 are the construction diagrams of some embodiments of this invention.

Among FIGS. 1 (*a*) to (*h*) inclusive, which are circuit diagrams for explaining the principles of a filter amplifier of this invention, FIG. 1 (*a*) shows a four-terminal voltage network composed of two-terminal constant impedance circuit type network in which two resistances $r_1$ and $r_2$ are connected parallel to two reactive impedances $Z_1$ and $Z_2$, respectively, and those two parallel circuits are connected further in series as shown in the drawing. The resistances $r_1$and $r_2$ include the inherent resistance of the impedances $Z_1$ and $Z_2$. The input impedance Z is as follows:

$$Z=\frac{r_1Z_1}{r_1+Z_1}+\frac{r_2Z_2}{r_2+Z_2} \qquad (1)$$

If $$Z_1Z_2=r_1r_2 \text{ and } r_1=r_2=r$$

then, the input impedance Z becomes as follows:

$$Z=\frac{r_1Z_1}{r_1+Z_1}+\frac{\frac{r^4}{r_1Z_1}}{\frac{r^2}{r_1}+\frac{r^2}{Z_1}}=\frac{rZ_1+r^2}{r+Z_1}=r \qquad (2)$$

Therefore, if the source voltage E is applied to this network, the output voltages $V_1$ and $V_2$ across the terminals of the resistances $r_1$ and $r_2$ become, respectively, as follows:

$$V_1=\frac{E}{r+Z}\cdot\frac{r_1Z_1}{r_1+Z_1}=\frac{V}{Z}\cdot\frac{r_1Z_1}{r_1+Z_1}$$

$$V_2=\frac{E}{r+Z}\cdot\frac{r_2Z_2}{r_2+Z_2}\cdot\frac{V}{Z}\cdot\frac{r_1Z_1}{r_2+Z_2}$$

inasmuch as $Z_1Z_2=r^2$. Finding the difference of the two outputs $V_1$ and $V_2$, $$V_1-V_2=\frac{V}{Z}\cdot\left(\frac{r_1Z_1}{V_1+Z_1}-\frac{r_2Z_2}{r_2+Z_2}\right)=\frac{V}{r}\cdot\frac{r^2(Z_1-r^2/Z_1)}{(r+Z_1)\quad(r+r^2/Z_1)}$$

$$=V\cdot\frac{Z_1^2-r^2}{(r+Z_1)^2}=V\cdot\frac{Z_1-r}{Z_1+r} \qquad (3)$$

Since $$|Z_1-Z_1+r|$$

is equal to 1, the difference $V_1-V_2$ is of a constant amplitude. This relation is the same as the relation of the well-known two terminal constant impedance network.

If $Z_1=Z_2$, and $r_1=r_2=r$, then the imput impedance Z is as follows:

$$Z=\frac{r_1Z_1}{r_1+Z_1}+\frac{r_2Z_2}{r_2+Z_2}=2\frac{rZ_1}{r+Z_1} \qquad (4)$$

Therefore, the difference $V_1-V_2$ is as follows:

$$V_1-V_2=\frac{V}{Z}\left(\frac{r_1Z_1}{r_1+Z_1}-\frac{r_2Z_2}{r_2+Z_2}\right)=\frac{V}{Z}\left(\frac{rZ_1}{r+Z_1}-\frac{rZ_1}{r+Z_1}\right)=0 \qquad (5)$$

This means that the output becomes zero.

Thus, the Equations 2 and 4 indicate that the same design theory holds as that of the lattice-type network where if the series and the lattice element impedances $Z_1$ and $Z_2$ are so chosen that they nearly satisfy the relations $Z_1Z_2\doteqdot r^2$ and therefore $$\sqrt{\frac{Z_1Z_2}{r^2}}\doteqdot 1$$

for the transmission band, (10) $Z_1=Z_2$, and therefore $$\sqrt{\frac{Z_1}{Z_2}}\doteqdot 1$$

for the attenuation band, then any filter can be designed. It is therefore possible to design a four terminal voltage filter with the network of FIG. 1(*a*). Furthermore, while two sets of impedances $Z_1$ and $Z_2$ are required in a lattice-type network only one set is sufficient for the network of this invention, without any transformation of the network.

Referring to FIG. 1(*b*) wherein a two-terminal constant impedance circuit type network in which two resistances $r_1$ and $r_2$ are connected in series with two impedances $Z_1$ and $Z_2$ respectively, and those two series circuits are connected further in parallel, the input impedance Z becomes as follows:

$$Z=\frac{1}{\frac{1}{r_1+Z_1}+\frac{1}{r_1+Z_1}}=\frac{(r_1+Z_1)(r_1+Z_2)}{r_1+r_2+Z_1+Z_2}$$

If $z_1z_2=r_1r_2$, and $r_1=r_2=r$, then the input impedance Z is as follows:

$$Z=\frac{(r+Z_1)^2}{(r+Z_1)^2}\cdot r=r \qquad (6)$$

The difference of the output voltages is as follows:

$$V_1-V_2=\frac{V}{Z}\left\{\frac{r_1(r_2+Z_2)}{r_1+r_2+Z_1+Z_2}-\frac{r_2(r_1+Z_1)}{r_1+r_2+Z_1+Z_2}\right\}=$$

$$\frac{V}{r}\cdot\left(\frac{rZ_1}{r+Z_1}-\frac{rZ_2}{r+Z_2}\right)=V\cdot\frac{Z_1-r}{Z_1+r} \qquad (7)$$

Thus, as in the case shown by Equation 3, an output of a constant amplitude is obtained.

If $z_1=z_2$, and $r_1=r_2=r$, then the impedance Z and the difference $V_1-V_2$ as as follows:

$$Z=\frac{(r+Z_1)^2}{2(r+Z_1)}=\frac{r+Z_1}{2} \qquad (8)$$

$$V_1-V_2=\frac{V}{Z}\left\{\frac{r(r+Z_1)}{2(r+Z_1)}-\frac{r(r+Z_1)}{2(r+Z_1)}\right\}=0 \qquad (9)$$

Thus, the Equations 6 to 9 are obtained, which holds the same relations as the Equations 2 to 5 and thus also make it possible to design a voltage filter. As has been described, the design Equations 2, 3 or 6, 7 for four-terminal networks of FIGS. 1(*a*) and (*b*) which are derived from the two-terminal constant impedance type network containing resistances, are the conditions for the transmission band in designing a filter of the lattice-type network having the elements $Z_1$ and $Z_2$, while the Equations 4, 5 or 8, 9 are the conditions for the damping band. By choosing the elements $Z_1$ and $Z_2$ so as to satisfy both of these conditions the required band filter is obtained. The design of the elements $Z_1$ and $Z_2$ which satisfy the Equation 10 is the same as Cauer's lattice-type filter design theory, and the well-known design table is already published. Since, however, two sets of elements $Z_1$ and $Z_2$ are generally required in realizing a lattice-type circuit, the circuit is usually transformed into a ladder-type circuit which decreases the number of elements by half although it generally requires mutual inductance or an ideal transformer. Riegger's or Jaumann's transformation is an example of the latter. A detailed description of the Cauer type filter appears in the publication entitled "Synthesis Linear Communication Network," written by W. Cauer and published by the McGraw Hill Book Company, 1958, pages 111–112. The Jaumann and Riegger type filters are described on page 370 of said publication.

Since, in this invention, a filter is realized with only a set of elements $Z_1$ and $Z_2$ of Cauer's design theory itself and with only two additional resistance elements $r$'s, it is very economical. However, the network of FIG. 1($a$) or ($b$) as it is, is nothing but a voltage filter whose output terminals are open. There are losses in transmission due to the resistance effects.

This invention intends to realize a lossless filter by making the resistances $r$ included in the constant of a transistor circuit.

Now referring to the network of FIG. 1($c$) wherein the impedance $Z_2$ and the resistance $r_2$ of FIG. 1($b$) are interchanged, the input impedance $Z$ is the same as that of FIG. 1($b$), but the output voltage $V_1-V_2$ is different therefrom and is as follows:

$$V_1-V_2=\frac{V}{Z}\left\{\frac{r_1(r_2+Z_2)}{r_1+r_2+Z_1+Z_2}-\frac{Z_2(r_1+Z_1)}{r_1+r_2+Z_1+Z_2}\right\} \quad (10)$$

If $Z_1=Z_2$ and $r_1=r_2=r$, then $$V_1-V_2=V\frac{r-Z_1}{r+Z_1} \quad (11)$$

Thus, if $Z_1=Z_2$, only the output voltage changes and is expressed in term of that impedance $Z_1$ as shown in the Equation 11. It will be understood from this fact that the transmission loss varies with the frequency and that the network of FIG. 1 ($c$) is a constant resistance damping equalizer whose input impedance is given by $Z=r$.

From the networks of FIG. 1 ($a$) and ($b$), four-terminal voltage filters of Riegger type shown in FIG. 1 ($d$) and ($e$) and those of Jaumann type shown in FIG. 1 ($g$) and ($h$) are also obtained by using a transformer T. FIG. 1 ($f$) is a network which is similar to that of FIG. 1 ($b$) and in which the output terminals are from the midpoints of the impedances and the resistances. Here, the resistances $r_1$ and $r_2$ are so chosen that $r_1=r_2=r$, and the impedances $Z_1$ and $Z_2$ are so chosen that $Z_1Z_2\doteqdot r^2$ in the transmission band and $Z_1=Z_2$ in the damping band. In the networks shown in FIGS. 1 ($d$)–($h$), if $$r_1=r_2=r\rightarrow 0$$

or $\infty$, they become equivalent to the well-known Riegger or the Jaumann circuit.

According to this invention, a filter amplifier is provided based upon the above principles, in whose gain, the losses of the voltage filter are compensated by substituting the effective resistances of the transistor base or emitter for the above-mentioned resistances $r_1=r_2=r$.

FIG. 2 shows construction diagrams obtained by applying this invention to the network of FIG. 1 ($a$). In FIG. 2 ($a$), similar N type transistors $T_1$ and $T_2$ are used in a grounded emitter type amplifier. Let the resistance of the base, of the emitter, and of the collector be $r_b$, $r_e$, and $r_c$, respectively, then the input impedances of the transistors $T_1$ and $T_2$ for emitter grounding and for base grounding, respectively, are as follows:

For emitter grounding, $$r_b+r_e\frac{r_c}{r_c(1-\alpha)+r_e}=r_b+\frac{r_e}{1-\alpha} \quad (12)$$

for base grounding, $$r_e+r_b\frac{r_c(1-\alpha)}{r_b+r_c}\doteqdot r_e+r_b(1-\alpha)$$

where $$\alpha=\frac{I_c}{I_e}$$

or $\alpha$ is a current gain for base grounding ($I_c$ a collector current, and $I_e$, an emitter current).

In FIG. 2 ($a$), for example, transistors $T_1$ and $T_2$ and adjustable resistances $r_1'$ and $r_2'$ are used instead of the resistances $r_1$ and $r_2$ of the network shown in FIG. 1 ($a$). By adjusting one or the other of the adjustable resistances $r_1'$ and $r_2'$ so that the following equations are satisfied:

$$r_1=r_1'+r_b+\frac{r_e}{1-\alpha} \quad (13)$$

$$r_2=r_2'+r_b+\frac{r_e}{1-\alpha},\ r_1=r_2=r$$

and by letting the impedances $Z_1$ and $Z_2$ satisfy the Equations 2 and 4 or 6 and 8, then it is obvious that the filter amplifier mentioned above can be designed. Here, the adjustable resistances, $r_1'$, $r_2'$ may be inserted either on the base side or on the emitter side. It is only necessary to adjust one of them so as to satisfy the Equation 13. By utilizing the difference of the amplified output of the transistors $T_1$ and $T_2$, the filter base on the principle of FIG. 1 ($a$) can consequently be designed.

FIG. 2 ($b$) and FIG. 2 ($c$) show filter amplifiers of this invention, wherein and N type and a P type grounded emitter amplifier are used and wherein two N type grounded base amplifiers are used respectively. The resistances $r_1'$ and $r_2'$ of FIG. 2 ($c$) are so chosen as to satisfy the Equation 13. In FIG. 2 ($d$), only one transistor $T_1$ is used, and the output of the resistance connected in parallel to the impedance $Z_2$ is taken out directly, only a voltage applied to the resistance comprising the input resistance of the transistor $T_1$ being amplified.

In FIG. 3 which shows Jaumann type embodiments of this invention, ($a$) shows a circuit in which two transistors $T_1$ and $T_2$ are used in emitter ground type and the difference of the outputs of the transistors $T_1$ and $T_2$ is taken out by a transformer T; ($b$) and ($c$) show circuits wherein two N type transistors are used and wherein an N type and a P type transistor are used respectively; ($d$) and ($e$) show circuits in which only one transistor $T_1$ is used and the output of the resistance connected in series to the impedance $Z_1$ is directly taken out, only a voltage applied to the resistance comprising the input resistance of the transistor $T_1$ being amplified. The circuit of FIG. 3 ($f$) is a damping equalizer as given by the Equation 11, where the outputs of the transistors $T_1$ and $T_2$ are taken as shown in FIG. 1 ($c$).

As explained above in detail, it is necessary in order to apply this invention generally, that the input admittance $Y_{11}$ (or impedance $Z_{11}$) and the transmission admittance $Y_{12}$ (or impedance $Z_{12}$) of the resultant admittance (or resultant impedance) of the four-terminal network; in which two sets of two-terminal admittances $Y_1$ and $Y_2$ (or impedances $Z_1$ and $Z_2$) and conductances $g_1=g_2=g$ (or resistances $r_1=r_2=r$) are connected as in FIG. 1 ($a$) or ($b$), namely, $$\left.\begin{aligned}Y_{11}&=\frac{1}{1+Y_1}+\frac{1}{1+Y_2}\\Y_{12}&=\frac{1}{1+Y_1}-\frac{1}{1+Y_2}\end{aligned}\right\} \quad (14)$$

as standardized according to the relation $g_1=g_2=1$ (in case of an impedance system, $r_1=r_2=1$ and $Y\rightarrow Z$); be so chosen that $|Y_{11}|=|Y_{12}|=1$ in the transmission region and $Y_{12}=0$ in the attenuation band. Conversely, solving the Equation 14 for $Y_1Y_2$, the following results are obtained.

$$Y_1=\frac{2-(Y_{11}+Y_{12})}{Y_{11}+Y_{12}},\ Y_2=\frac{2-(Y_{11}-Y_{12})}{Y_{11}-Y_{12}} \quad (15)$$

This means that, in the transmission band, approximately $Y_1Y_2=1$; and in the attenuation band approximately $Y_1=Y_2$. In general, if the admittances $Y_{11}$ and $Y_{12}$ are functions of complex variables, $Y_1$ and $Y_2$ are also realized by functions of complex variable. Even if the real parts of the admittances $Y_{11}$ and $Y_{12}$ are negative, if $$R(Y_{11}+Y_{12})>=2$$

it is possible to make the real parts of the admittances $Y_1$ and $Y_2$ positive. Again, even if either of the admittances $Y_{11}$ and $Y_{12}$ is a negative real function, the admittances $Y_1$ and $Y_2$ can be made positive. From the theory of network design, it is not always necessary that the admittances $Y_{11}$ and $Y_{12}$ of Cauer's design theory should be pure imaginary functions; they can be complex numbers instead.

We claim:

1. A four terminal filter amplifier comprising:

(A) a pair of input terminals;

(B) first and second networks connected in series to said input terminals, at least one of the networks including a transistor, (1) said first network comprising first impedance and resistance means connected in a first parallel circuit, (2) said second network comprising second impedance and resistance means connected in a second parallel circuit, (3) said parallel circuit being connected to each other in series across said input terminals, (4) the impedances and resistances of said first and second impedance and resistance means satisfying the relation in the pass-band of said filter amplifier that the product of resistances is substantially equal to the product of impedances, and in the attenuation band of said filter amplifier that the impedances of the impedances means are substantially equal, (5) at least one of said resistance means comprising the input resistance appearing between the base and emitter electrodes of said transistor, (C) means for deriving an output voltage substantially proportional to the difference between the voltage which appears across said first and second resistance means respectively, (1) at least one of said voltages including the output voltage appearing across the emitter and collector electrodes of said transistor;

(D) and a pair of output terminals connected to said deriving means.

2. A four terminal filter amplifier comprising:

(A) a pair of input terminals;

(B) first and second networks connected in parallel across to said input terminals, at least one of said networks including a transistor;

(1) said first network comprising first impedance and resistance means connected in series, (2) said second two-terminal network comprising second impedance and resistance means connected in series, (3) the impedances and resistances of said first and second impedance and resistance means satisfying the relation in the pass-band of said filter amplifier that the product of resistances is substantially equal to the product of impedances, and in the attenuation band of said filter amplifier that the impedances of the imepdance means are substantially equal, (4) at least one of said resistance means comprising the input resistance appearing between the base and emitter electrodes of said transistor, (C) means for deriving an output voltage substantially proportional to the difference between the voltages which appear across the first and second resistance means, respectively, (1) at least one of said voltages including the output voltage appearing across the emitter and collector electrodes of said transistor;

(D) and a pair of output terminals connected to said deriving means.

3. A four terminal filter amplifier comprising:

(A) a pair of input terminals;

(B) first and second networks connected in parallel to said input terminals, at least one of said networks including a transistor, (1) said first network comprising first impedance and resistance means connected in series, (2) said second network comprising second impedance and resistance means connected in series, (3) the impedance and resistance of said first and second impedance means and resistance means satifying the relation in the attenuation band of said filter amplifier that the product of resistance is substantially equal to the product of impedances, and in the pass-band of said filter amplifier that the impedances of the impedance means are substantially equal, (4) at least one of said resistance means comprising the input resistance appearing between the base and emitter electrodes of said transistor;

(C) means for deriving an output voltage substantially proportional to the difference between the voltages which appear across one of said first and second impedance means and one of said first and second resistance means, (1) at least one of said voltages including the output voltage appearing across the emitter and collector electrodes of said transistor.

(D) and a pair of output terminals connected to said deriving means.

References Cited by the Examiner

UNITED STATES PATENTS

| | | | |
|---|---|---|---|
| 1,724,987 | 8/29 | Zobel | 333—70 |
| 1,772,506 | 8/30 | Affel | 333—70 |
| 1,958,742 | 5/34 | Cauer | 333—70 |
| 2,788,496 | 4/57 | Linwill | 333—80 |
| 2,928,001 | 3/60 | McLean | 333—80 |
| 2,933,703 | 4/60 | Kuraruwala | 333—80 |
| 3,045,194 | 7/62 | Sandberg | 333—80 |
| 3,068,329 | 12/62 | De Monte et al. | 333—80 |

HERMAN KARL SAALBACH, *Primary Examiner.*

BENNETT G. MILLER, *Examiner.*